United States Patent [19]

Van Laethem et al.

[11] 4,349,371

[45] Sep. 14, 1982

[54] PROCESS FOR COATING GLASS

[75] Inventors: Robert Van Laethem, Loverval; Albert Van Cauter, Charleroi; Robert Terneu, Thiméon, all of Belgium

[73] Assignee: BFG Glassgroup, Paris, France

[21] Appl. No.: 228,235

[22] Filed: Jan. 26, 1981

[30] Foreign Application Priority Data

Jan. 31, 1980 [GB] United Kingdom ............. 8003357

[51] Int. Cl.³ .................. C03C 17/00; C03C 17/10; C03C 17/25
[52] U.S. Cl. ............................ 65/60.4; 65/60.5; 65/60.51; 65/60.52; 427/110; 427/160; 427/168
[58] Field of Search .................. 427/110, 160, 168; 65/60.4, 60.5, 60.51, 60.52

[56] References Cited

FOREIGN PATENT DOCUMENTS 1516032 6/1978 United Kingdom .
1523991 9/1978 United Kingdom .

Primary Examiner—James R. Hoffman
Attorney, Agent, or Firm—Spencer & Kaye

[57] ABSTRACT

In the formation of a metal or metal compound coating on a face of a heated glass substrate during its forward displacement by contacting such face at a coating station with at least one stream of droplets comprising one or more substances from which the coating is formed, problems are encountered in controlling the thickness of the coating.

To facilitate such control, the or each droplet stream (21) is downwardly inclined towards the substrate (4) in the forward (6) direction or in a rearward direction, and at least one current (25) of preheated gas is discharged into the environment above the substrate (4) to flow in the same forward or rearward direction as the droplet stream(s) (21) and into contact therewith, the preheated gas current temperature being such as to influence the temperature of the droplets on their way to the substrate.

The invention includes apparatus for performing the method.

25 Claims, 1 Drawing Figure

PROCESS FOR COATING GLASS

BACKGROUND OF THE INVENTION

This invention relates to a process of forming a metal or metal compound coating on a face of a heated glass substrate during its displacement in a given direction by contacting such face at a coating station through which the substrate passes, with at least one stream of droplets comprising a substance or substances from which said coating metal or metal compound is formed on said face. The invention also relates to apparatus for use in carrying out such a process.

Processes of the above kind are employed for forming coatings which modify the apparent colour of the glass and/or which have some other required properties in respect of incident radiation, e.g. an infra-red-reflecting property.

When forming a coating on a moving glass substrate by spraying, problems are encountered in controlling the thickness of the coating so that it complies with given standards. The thickness of the coating forming on any region within the area of the substrate is susceptible to the influence of various factors. These include the spraying rate, the direction of the spray in relation to the direction of movement of the substrate, and the temperature conditions at that region when it is coated.

It is known to discharge the droplets as a stream which is inclined downwardly towards the substrate and in the general direction in which the substrate is moving. Direction of the spray in that way has been found to be most beneficial for promoting steady conditions at the zone of impingement of the droplets on the substrate. But of course direction of the spray in that manner cannot in itself ensure a deposit of a given thickness at a given region of the substrate, even if the rate of delivery of material through the sprayer is accurately controlled.

The temperature conditions under which any given region of the substrate is coated depend inter alia on the temperature of that region of the substrate when it is sprayed. A relatively high substrate temperature implies a relatively thick coating. Proposals have previously been made to control the temperature of the substrate so that each region will be at an appropriate temperature when it is exposed to the spray, but so far such proposals have not led to satisfactory results. Adjustments of the temperature of the substrate, and in particular its temperature profile transversely of its path of movement through the coating station, could not be made with sufficient speed and accuracy for purposes of industrial production. For similar reasons it has been found to be unsuitable to exercise control of the coating thickness merely by controlling the temperature of the coating precursor material fed to the sprayer.

SUMMARY OF THE INVENTION

It is an object of the invention to provide a coating process of the kind referred to wherein the temperature conditions at the coating station are influenced in a way which facilitates control of the thickness of the coating.

According to the present invention there is provided a process of forming a metal or metal compound coating on a face of a heated glass substrate during its displacement in a given direction (hereafter called "forwardly") by contacting such face, at a coating station through which the substrate passes, with at least one stream of droplets comprising a substance or substances from which said coating metal or metal compound is formed on said face, characterised in that said stream(s) of droplets is or are downwardly inclined towards the substrate in a forward or rearward direction, and in that at least one current of pre-heated gas is discharged into the environment above the substrate so that such gas flows in the same (forward or rearward) direction above the substrate and into contact with said stream(s), the temperature of such gas current(s) being such that said current(s) influence(s) the temperature of droplets of said stream(s) on their way to the substrate.

One or more gas currents functioning in accordance with the invention can serve as a very convenient and efficient control parameter for influencing coating thickness. Heat exchange between the gas current(s) and droplets of the sprayed material is more efficient than heat exchange between such material and the hot substrate. Because the sprayed material is in a state of fine subdivision when contacted by the gas current(s) the latter can influence the temperature of the sprayed material so as to affect the thickness of the coating forming on the substrate notwithstanding the very short contact time between the sprayed material and the gas current(s).

The efficacy of the gas current(s) for the stated purpose is dependent on the downward inclination of the droplet stream(s) and the flow of gas current(s) over the substrate in the same general direction as that in which the droplet stream(s) is or are downwardly inclined, i.e. in the same general direction as that of the horizontal or main horizontal component of motion of the droplets. Under these conditions the gas current(s) can act in the required manner while maintaining a steady condition of the spray. This steady condition is itself important for avoiding unpredictable variations of the coating thickness.

The invention is based on the discovery of the significant effects on coating thickness which can result from the heating or cooling of droplets containing coating precursor material. Modification of the temperature of the droplets alters the amount of heat energy which requires to be exchanged between the substrate and the droplets on their contact with the substrate, in order to form a given amount of coating material from the coating precursor compound(s) contained in the droplets. This phenomenon may in some cases be attributable to the influence of the gas current(s) on the evaporation and/or decomposition of material in the droplets, depending on their composition. For example when spraying a solution of a coating precursor compound, heating or cooling of the droplets may promote or retard evaporation of solvent from the droplets and/or decomposition of the precursor compound. However the invention is not confined to processes wherein any such explanation of the influence of the gas current(s) on the thickness on the coating applies. Tests show that in certain coating processes the amount of coating material forming on the hot glass substrate from a given quantity of sprayed material is influenced by a change in the temperature of the spray droplets to an extent which cannot be accounted for by loss from the droplets either of a quantity of coating precursor compound or of a quantity of a carrier liquid, e.g. a solvent, for such compound.

In preferred embodiments of the invention the gas constituting the aforesaid gas current(s) is preheated to an extent such that it heats said droplets. Generally speaking the principle of the invention can be more satisfactorily applied in that way and it is of greater practical value in industrial plant for the production of coated glass.

Advantageously, the droplets comprise a solution of a metal compound and said gas current(s) accelerate or retard evaporation of solvent from the droplets.

The gas current(s) can function across the full width of the substrate area to be coated, or selectively at one or more zones within that width. Furthermore such current(s) can be used as a control measure for rapidly changing the thickness or the thickness profile of the coating. More specifically: one or more said gas currents can be caused to influence the temperature of the sprayed material similarly at all positions across the path of the substrate so that the thickness of the coating is affected similarly at all zones across the coated area. Alternatively the said gas current(s) can be caused to influence the temperature of the sprayed material selectively or differentially at one or more regions across said path. Advantageously such a selective or differential action is such that it at least partly compensates for a tendency for the coating to vary in thickness because of other factors, e.g. a variation in the temperature of the substrate from one region thereof to another.

In certain preferred embodiments of the invention the coating method is employed for coating a continuous ribbon of flat glass during its travel from a flat glass forming plant, e.g. during its travel along a tunnel or lehr (e.g. an annealing lehr) within which the coating station is located, and the gas current(s) differentially affect the temperature of the droplets travelling towards different regions across the ribbon path so as to promote the formation of a coating which is of substantially uniform thickness over the full coated width of the ribbon. Such processes are useful for example for forming a coating of substantially uniform thickness on a continuous ribbon of freshly formed glass during its travel along a said tunnel or lehr from a flat glass drawing machine or from a float tank.

During travel along a lehr as above referred to the side margins of the substrate, which are nearer the side boundaries of the lehr, tend to cool more quickly than the medial part of the substrate width. Therefore those marginal regions tend to be at a somewhat lower temperature than such medial part on arrival at the coating station. In the absence of any compensating measures, those temperature gradients across the substrate would usually tend to cause the thickness of the coating to decrease towards the side margins of the substrate. Some compensation may in practice occur when using a sprayer which is reciprocated transversely of the substrate path as hereinafter referred to, e.g. because of deceleration of the sprayer near the ends of its traverse, but this compensation is not in itself sufficient to achieve the standards of uniformity of the coating thickness which are now often in demand. By differentially affecting the temperature of droplets travelling towards different regions across the substrate path, in carrying out the present invention, a more satisfactory compensation can be achieved. The manner in which the temperature of the gas current(s) should vary across the path of the substrate in order to effect the required compensation depends upon the composition of the droplets of the sprayed material. For example, when spraying droplets containing a coating precursor compound which can be evaporated or decomposed by heating of the droplets so that the composition of the residual droplets on their arrival at the substrate is more dilute, the droplets travelling towards a central region of the substrate path through the lehr should be heated to a greater extent or cooled to a lesser extent than the droplets travelling towards the side margins of such path in order to compensate for the aforesaid temperature gradients across the substrate. As another example, when spraying a coating precursor compound dissolved in a solvent which can be evaporated from the droplets to an extent which depends on the temperature of the environment through which the droplets travel, the droplets travelling towards the marginal regions of the substrate path should be heated to a greater or cooled to a lesser extent than the droplets travelling towards the central region of such path in order to compensate for the aforesaid temperature gradients across the substrate. It will be readily seen that in certain processes, depending on the composition of the droplets, the effect on coating thickness of a change in the temperature of the droplets may not be capable of such simple analysis, for example because the gas current(s) may promote or retard evaporation or decomposition of both a coating precursor compound and carrier liquid. However by tests using droplets of a given composition, it can easily be established what is the appropriate temperature profile to be created by the gas current(s) across the lehr at the coating station, for forming a coating having a predetermined thickness profile.

When setting up a given coating apparatus for carrying out the invention, it is necessary to ensure that the droplets retain sufficient density to avoid their entrainment from the droplet stream(s) by the temperature-controlling gas current(s) so that the droplet stream(s) can be kept in ready condition. Such density is of course affected by any evaporation of substance(s) from the droplets during their travel. But in methods wherein solvent is caused to evaporate from the droplets by the gas current(s) it was found in some cases to be beneficial to evaporate as much of the solvent as possible from the droplets, consistent with the steady stream condition. It appeared that the coating quality was particularly good when evaporation of the solvent was completed on or immediately after contact of the droplets with the hot substrate.

Should it be required in the course of a coating process according to the invention to vary the thickness of the coating forming on any given region across the substrate from droplets whose temperature is being influenced by one or more said gas currents, this can be done very easily by adjusting the temperature to which such gas is brought prior to its discharge into the environment above the substrate. It is very much easier to vary the temperature of the gas current(s) than it is to vary the temperature of the glass substrate or the coating material feeding to the sprayer.

The droplets may be discharged in a stream or streams whose impingement zone or combined impingement zones on the substrate cover(s) the entire width of the substrate area to be coated. In that case the source or sources of the stream(s) can be stationary. Preferably however the impingement zone(s) of the droplet stream(s) on the substrate cover(s) only part of the substrate width to be coated and such stream(s) is or are repeatedly displaced to and fro transversely of the path of conveyance of the substrate through the coating station so that the stream(s) act(s) over the full width of the substrate area to be coated.

In such circumstances, the gas current(s) acting on the droplets according to the invention can exert across the substrate path a differential thermal action on the droplets which takes into account any tendency for the amount of coating material deposited per unit area of the substrate to be greater near the side edges of the substrate due to deceleration of the sprayer as it nears the ends of its traverse.

The droplet stream(s) should remain steady during the coating process. This is easier to achieve if the or each stream is continuously exposed (as distinct from being intermittently exposed) to the action of a current or currents of the temperature-controlling gas. In preferred embodiments of the invention said current(s) of gas is or are discharged continuously and the or each droplet stream is continuously contacted over its full width by one or more said currents.

Preferably one or more said currents of gas is or are discharged from a stationary orifice or from a series of stationary orifices extending or distributed transversely over the path of the substrate. An effective temperature control can be much more easily achieved in that manner. If the droplet stream(s) is or are displaced along a transverse path across the substrate at the coating station and one or more said currents of gas is or are discharged so that some of the gas flows across that path, out of line with the droplet stream(s), that gas can exert a useful scavenging effect in removing vapours from the transverse path of the stream(s) and preventing them from becoming entrapped in such stream(s). In these circumstances the process also utilises the invention which is the subject of co-pending Patent Application Ser. No. 228,232 entitled "Process and apparatus for coating glass", filed on the same date as this application and claiming priority from United Kingdom Patent Application No. 80 03 382.

Advantageously, gas currents are continuously discharged from a series of discharge orifices as aforesaid and quanta of gas supplied to different orifices or groups of orifices are pre-heated to temperatures which are independently regulated for controlling the coating thickness profile across the substrate.

The invention includes processes wherein the gas forming said current(s) is subjected to a pre-heating which is automatically controlled in dependence on signals emitted by a device which detects thickness values of the coating on the moving substrate at a detecting station located forwardly of the coating station. The coating thickness can e.g. be assessed by determining the laser beam reflecting property of the coating. Alternative available methods of determining coating thickness are for example those which measure the retrodiffusion of $\beta$-rays or which measure the reflection or transmission of light rays by means of a spectrophotometer, and methods using an X-ray fluorescing detector or based on interferometry or scanning microscope techniques.

The gas forming the temperature-controlling gas current(s) is preferably air. However some other gas, e.g. an inert gas such as nitrogen, can be used.

Preferably the or each said gas current is directed towards the or a said droplet stream so as to encounter that stream at a zone spaced above the substrate. The energy of the droplets decreases from their source towards the substrate and by directing the gas current(s) against the droplets before they are at their minimum energy, it is easier to avoid entrainment of droplets from their desired trajectories in the stream. It is to be noted that the nearer is the said action zone of the gas current(s) to the source of the droplet stream, the shorter is the time during which the droplets are directly exposed to such current(s).

The performance of the present invention may entail simultaneous use of the invention described and claimed in co-pending Patent Application Ser. No. 228,233 entitled "Process and apparatus for coating glass", filed on the same date as this application and claiming priority from United Kingdom Patent Application No. 80 03 359. As described in the specification of that Application by causing a jet of gas to flow against the rear of a downwardly inclined stream of droplets of coating material, (the rear being where the droplets have the shortest trajectories), it is easier to form optical coatings without the occurrence of coating defects causing light diffusion at the interfacial zone between the glass substrate and the coating or at the coating surface. This is thought to be due to the interception of dilution of spuriously formed reaction products which may tend to be entrained downwardly behind the droplet stream and into contact with the glass or with a coating thereon. The action of a temperature-controlling gas current against a droplet stream which occurs in carrying out the present invention can therefore have the secondary effect of improving the coating quality.

However, as stated in the said co-pending Application, for achieving the best improvements in coating quality referred to therein it is preferable for a said rear gas jet to be directed against the substrate to the rear of the zone of impingement of the droplet stream thereon so that the rear gas jet is deflected against such stream. Such a preferred embodiment of the invention disclosed in the said co-pending Patent Application can be carried out simultaneously with the performance of the present invention by using one or more gas currents for influencing the temperature of the droplets travelling towards the substrate and propelling a jet of gas (which need not be pre-heated) at a downward inclination towards the substrate behind the droplet stream so that such jet becomes deflected by the substrate against the rear of such stream.

It is very advantageous to combine controlled heating of spray droplets in accordance with the invention with control of the temperature condition of the substrate just prior to the coating operation.

In carrying out the present invention the droplet stream(s) is or are preferably downwardly and forwardly inclined. With this arrangement it is easier to form coatings of uniform structure, particularly if the coatings are relatively thick. Such a direction of a coating spray is claimed in United Kingdom Pat. No. 1,516,032.

Preferably the droplet stream(s) is or are inclined so that the included angle between the axis or axes of the droplet stream(s) and the substrate face being coated is in the range 20° to 60° and most preferably in the range 25° to 35°. This feature facilitates the formation of coatings of good optical quality. For obtaining the best results all parts of the droplet stream(s) should be incident upon the substrate at a substantial inclination to the vertical. Accordingly, in the most preferred embodiments of the invention use is made of at least one said droplet stream which is a parallel stream or is one which diverges from its source at an angle of not more than 30°, e.g. an angle of about 20°.

Experiments indicate that uniform coatings can be more easily formed if certain conditions are observed with respect to the perpendicular distance between the substrate face being coated and the source of the droplet stream(s). Preferably such distance, measured normally to the substrate face, is from 15 to 35 cm. This has been found to be the most suitable range, particularly when observing the preferred inclination and divergency ranges for the droplet stream above referred to.

The invention is very suitable for use in coating a continuous longitudinally moving glass ribbon.

The invention includes processes wherein the substrate is a continuous ribbon of flat glass travelling from a flat glass forming plant. In certain very advantageous embodiments the ribbon is a ribbon of float glass travelling from a float tank. In certain processes according to the invention, the droplet stream impinges on the top face of the ribbon of flat glass at a position downstream from the flat glass forming plant where the temperature of the glass is within the range 650° to 100° C.

The process according to the invention can be applied for forming various oxide coatings by employing a liquid composition e.g. a solution of a metal salt. Very advantageous processes according to the invention include processes wherein the droplets are droplets of a solution of a metal chloride from which a metal oxide coating forms on the substrate. In some such processes the said solution is a tin chloride solution, e.g. an aqueous or non-aqueous medium containing stannic chloride and a doping agent, e.g. a substance providing ions of antimony, arsenic or fluorine. The metal salt can be employed together with a reducing agent, e.g. phenyl hydrazine, formaldehyde, alcohols and non-carbonaceous reducing agents such as hydroxylamine, and hydrogen. Other tin salts may be used in place of or in addition to stannic chloride, e.g. stannous oxalate or stannous bromide. Examples of other metal oxide coatings which can be formed in a similar manner include oxides of cadmium, mangesium and tungsten. For forming such coatings the coating composition can likewise be prepared by forming an aqueous or organic solution of a compound of the metal and a reducing agent. Solutions of nitrates can be employed, for example iron and indium nitrates, for forming coatings of the corresponding metal oxides. As further examples the invention can be employed for forming coatings by pyrolysis of organo-metallic compounds, e.g. carbonyls and metal acetyl-acetonates supplied in droplet form to the substrate face to be coated. Also certain metal acetates and alkylates can be used, e.g. tin dibutyl diacetate and titanium isopropylate. It is within the scope of the invention to apply a composition containing salts of different metals so as to form a coating containing a mixture of oxides of different metals.

A coating formed by a process according to the invention may in certain circumstances possess a surface which has local structural faults, e.g. a surface which is uneven due to spurious deposits. Such defects can be removed by a surfacing treatment performed after formation of the coating. For example the surface of the coating can be subjected to an abrasion treatment.

The formation of spurious deposits can be avoided or reduced by employing exhaust ducting to draw gases away from the environment of the droplet stream(s). Accordingly, in certain embodiments of the invention, suction forces are created in exhaust ducting to draw gases environmental to the droplet stream(s) away from such stream(s), in the same direction (forwardly or rearwardly) over the substrate as that in which said gas current(s) is or are discharged. Such suction forces are of course controlled so that they do not disrupt the droplet stream(s) or render such stream(s) unsteady. Such processes combine performance of the present invention and the invention which is the subject of our United Kingdom Pat. No. 1,523,991 and they may also embody the invention described and claimed in co-pending Patent Application Ser. No. 228,234 entitled "Process and apparatus for coating glass", filed on the same date as this application and claiming priority from United Kingdom Patent Application No. 80,03,358.

The invention includes apparatus suitable for use in forming a metal or metal compound coating on a face of a glass substrate during its movement through a coating station, by a process according to the invention as hereinbefore defined. Apparatus according to the present invention comprises a substrate support, means for conveying a substrate in a given (hereafter called "forward") direction while it is thus supported, and spraying means for discharging at least one stream of droplets onto the supported substrate, and is characterised in that said spraying means is arranged for discharging said droplet stream(s) at a downward and forward or a downward and rearward inclination, and in that gas discharge means is provided for discharging a current or currents of pre-heated gas into the environment above the substrate to cause such current(s) to flow in the same (forward or rearward) direction above the substrate and into contact with the droplet stream(s) on their way to the substrate.

Preferably the gas discharge means comprises a series of gas discharge orifices distributed transversely over the path of conveyance of the substrate and means is provided whereby quantities of gas supplied to different orifices or groups of orifices can be pre-heated to different temperatures.

The invention includes apparatus as above defined and incorporating means for detecting the thickness of the coating on the moving substrate and for emitting signals which automatically control the pre-heating of gas supplied to said gas discharge orifice(s). For example said detecting means assesses the thickness of a coating by determining its laser beam reflecting property.

In certain apparatus according to the invention, there is means for controlling the temperature of the substrate just prior to its arrival at the coating station.

Preferably the spraying means is arranged for discharging the droplet stream(s) downwardly and forwardly.

In preferred apparatus according to the invention the spraying means is associated with driving means which operates repeatedly to displace said spraying means to and fro along a transverse path across the path of conveyance of the substrate.

Preference is given to apparatus wherein the spraying means is arranged to discharge a droplet stream in a direction such that the included angle between its axis and the horizontal is in the range 20° to 60°. Preferably the spraying means is constructed to discharge a droplet stream which is a parallel stream or is one which diverges from its source at an angle of not more than 30°, as hereinbefore referred to.

The invention includes apparatus as above defined, installed in assocation with a flat glass forming plant, e.g. a float tank, for coating a continuous ribbon of glass, travelling from that plant. Advantageously the spraying means is arranged so that in operation at least one of said droplet stream impinges on the top face of the glass ribbon at a zone where the temperature of the glass is within the range 650° to 100° C.

In some apparatus according to the invention there is gas exhaust means for causing gases in the environment of the droplet stream(s) to flow away from such stream(s) in the same direction (forwardly or rearwardly) over the substrate as that in which said gas discharge means discharges said gas current(s).

BRIEF DESCRIPTION OF THE DRAWING

Reference is now made to the accompanying diagrammatic drawing comprising FIG. 1, which is a cross-sectional side elevation of parts of a flat glass manufacturing plant incorporating a coating apparatus for carrying out the present invention.

DESCRIPTION OF THE PREFERRED EMBODIMENTS

Figure 1:
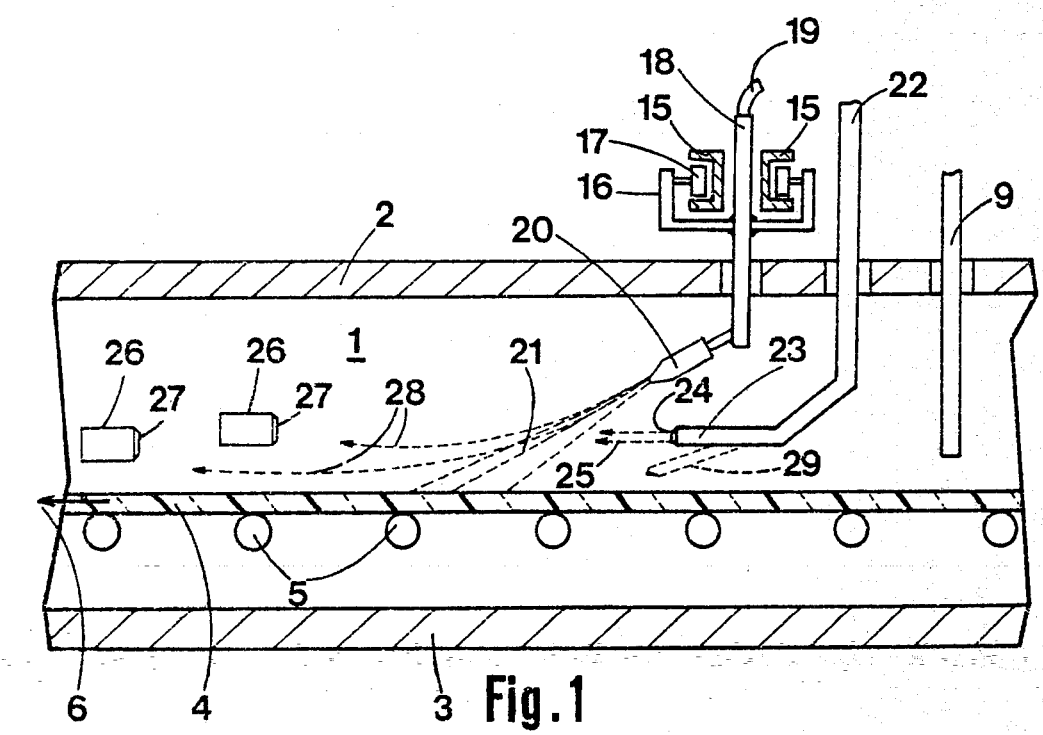

The drawing shows part of an annealing lehr 1 having refractory roof and sole walls 2 and 3, along which a freshly formed glass ribbon 4, supported on rollers 5, is conveyed in the direction indicated by arrow 6, from a ribbon forming section (not shown) of the flat glass manufacturing plant. The ribbon may for example be formed by a Libbey-Owens type glass drawing machine, or it may be formed by the float process.

The glass ribbon passes beneath a refractory screen 9 to a coating station within the lehr.

Above the coating station there are fixed rails 15 which extend transversely across the top of the lehr and form a track for a carriage 16. The carriage has rollers 17 which run along flanges of the said rails. The carriage supports a vertical tube 18 within which there are conduits such as 19 for conducting compressed air and a liquid coating material, e.g. a solution of a coating precursor compound, to a spray gun 20 which is carried by the tube 18.

Driving mechanism (not shown) displaces the carriage 16 to and fro along the rails 15 so that the spray gun 20 travels to and fro transversely across the path of the glass ribbon 4. The coating solution discharges from the spray gun as a steady conical spray cone 21. The coating precursor is transformed on contact with the hot glass ribbon into the required metal oxide or other coating substance, with which the ribbon becomes progressively coated over its entire width during its travel through the lehr.

Ducting 22 extends through the roof 2 of the lehr, rearwardly of the track rails 15, for conducting preheated gas into the lehr for heating the spray 21 in accordance with the present invention. The ducting 22 may comprise a single duct of flat elongate cross-section which extends over substantially the full width of the lehr, or it may comprise a plurality of ducts disposed side by side across the lehr. The lower end portion 23 of the ducting is disposed substantially horizontally and at a level such that the current or currents of pre-heated gas which issue from the discharge end orifice or orifices 24 of the ducting and is or are represented by the dotted lines 25, intersect(s) the spray 21 at a medial region of the droplet trajectories during the reciprocation of the spray across the ribbon path. The gas current or currents can be pre-heated to a temperature above or below the normal environmental temperature at the coating station so that such current(s) heat or cool the droplets during their travel towards the glass ribbon. It is preferable for the ducting 22 to comprise a plurality of side by side ducts as above referred to and for heating means, e.g. electrical resistance heaters, to be provided by which the volumes of gas supplied through the different ducts can be independently heated to different temperatures. It is then possible to modify the temperature of the droplets of spray cone 21 to an extent which varies during any given traversal across the ribbon of glass. Compensation can thereby be made for any residual inequalities in the temperature of the glass across the width of the ribbon, and for any accelerations and decelerations of the spray gun during each traversal of the spray cone across the ribbon, with a view to forming a coating which is of substantially uniform thickness over that width.

Gas discharging from the ducting 22 out of line with the spray 21 flows forwardly across the transverse path of such spray and assists in keeping that path free from vapours which may become entrapped in the spray and adversely affect the quality of the coating, as is described in the co-pending Patent Application Ser. No. 228,232 claiming priority from United Kingdom Patent Application No. 80,03,382 previously referred to.

The rate of discharge of pre-heated gas from the orifice or orifices 24 is such that the spray cone 21 is not disrupted by the gas jets. The droplet trajectories are not significantly affected.

At positions spaced forwardly from the path of transverse motion of the spray cone 21 across the ribbon there are exhaust ducts 26 which extend across the lehr and are connected to means (not shown) for maintaining suction forces in those ducts. The object of this exhaust system is to cause gases in the environment of the spray to be aspirated forwardly away from the path of reciprocation of the spray and into the entry nozzles 27 of the exhaust ducts, as suggested by the broken lines 28, and thereby reduce the risk of spurious surface deposits on the formed coating. The suction forces are adjusted so that the trajectories of the droplets from the spray gun are substantially unaffected and the process is therefore in accordance with the invention described and claimed in United Kingdom Pat. No. 1,523,991 hereinbefore referred to.

In addition to influencing the temperature of the spray droplets, the pre-heated gas currents issuing from the ducting 22 intercept or dilute some reaction products which may contaminate the environment behind the spray and be entrained downwardly into contact with the glass immediately before it is coated by the spray 21. This action, which is described and claimed in the aforesaid co-pending Patent Application Ser. No. 228,233 claiming priority from United Kingdom Patent Application No. 80,03,359, can however better be achieved by propelling currents of gas against the glass ribbon immediately to the rear of the impingement zones of the spray so that such currents flow against the bottom region of the spray cone. The illustrated apparatus can be modified by providing the ducting 22 with branch nozzles 29 as shown in broken lines so that rear gas currents acting in that manner are formed by some of the pre-heated gas supplied to the ducting 22.

The following are examples of processes according to the invention performed with the aid of apparatus as above described.

EXAMPLE 1

Coating apparatus as described with reference to FIG. 1 was employed for coating a ribbon of glass 3 meters in width in course of its travel along an annealing lehr from a Libbey-Owens type glass drawing machine. The speed of the glass ribbon along the lehr was of the order of 1 meter per minute.

The mean temperature of the glass ribbon at the coating station was about 600° C. The temperature of the marginal zones of the glass was appreciably lower than that of the central part of the ribbon width.

The spray gun 20 was of a conventional type, and was operated at a pressure of the order of 4 kg/cm². The gun was displaced to and fro across the ribbon path at a height of 30 cm above the glass ribbon, so as to complete nine reciprocations per minute along a path extending just beyond each side edge of the ribbon. The spray gun was directed so that the axis of the spray was at 30° to the plane of the glass ribbon. The spray cone angle was 20°.

The spray gun was fed with an aqueous solution of tin chloride at 25° C., such solution having been formed by dissolving hydrated tin chloride ($SnCl_2 2H_2O$) in water in an amount of 375 g of the tin chloride per liter and adding per liter 55 g of $NH_4HF_2$.

The rate of delivery of the coating solution was adjusted to form on the glass ribbon a coating of tin oxide doped by fluorine ions and having a thickness as near as possible to 7500 A.

The suction forces in the exhaust ducts 26 were adjusted to maintain a continuous flow of environmental gases away from the path of the spray cone as suggested by arrows 28 in the drawing without disrupting the spray cone.

The ducting 22 comprises ten side by side ducts covering equal portions of the ribbon width. The axes of the discharge end portions 23 of the ducts were 15 cm above the top face of the glass ribbon and the discharge orifices 24 were at a horizontal distance of 25 cm from the path swept by the rear of the travelling spray cone. Pre-heated air was supplied to the ducting at a temperature such that an air current discharged from each orifice 24 at a temperature of the order of 600° C. The hot air was supplied to the ducting at a volume rate of about 1800 m³/hr to maintain from each of the ten ducts a jet 25 having a velocity of 2 m/sec.

The pre-heating temperatures of the volumes of gas supplied through the ten ducts were independently adjustable in steps of 20° C. and the temperatures of the different volumes were independently adjusted to values such that the coating formed on the ribbon had a substantially uniform thickness across the full width of the ribbon notwithstanding the temperature gradients across the ribbon on reaching the coating station. The coating thickness at various places across the ribbon was continuously detected at a position within the lehr downstream from the exhaust ducts 26 using a laser beam and a sensor responsive to laser beam reflection, and signals from such sensor were used automatically to control the temperatures of the gas jets. In the result the coating thickness was at all positions across the ribbon 7500 A ±200 A.

In a comparative test in which the process was performed without employing the pre-heated gas jets but under otherwise unchanged conditions, the coating formed on the substrate was found to be thinner on side marginal portions of the ribbon than on its central portion. The variation in the thickness of the coating from the required value of 7500 A could not be reduced below ±500 A.

By pre-heating the gas supplied to ducting 22 to lower temperatures, e.g. to temperatures of the order of 120° C., the rate of evaporation of the solvent can be reduced, thereby leading to thinner coatings.

In another modification of the process according to Example 1, ducting 22 was used which had branch nozzles 29 via which a quantity of the pre-heated gas was discharged as downwardly inclined jets which impinged on the glass ribbon just to the rear of the path of the spray cone and flowed against the bottom of the spray cone during its movements across the ribbon. A comparison of the glass coated under those conditions with the glass coated without the influence of such downwardly inclined rear gas jets showed that those jets were beneficial for avoiding or reducing the occurrence of light-diffusing defects at the glass/coating interface.

A coating process according to the invention can be carried out by using the apparatus shown in FIG. 1 as in the foregoing example with the sole modification that the glass ribbon travels in the opposite direction to arrow 6. In those circumstances the droplet stream is directed downwardly and rearwardly within the meaning of this specification.

EXAMPLE 2

The apparatus shown in FIG. 1 was used for coating a ribbon of float glass 2.5 meters in width with cobalt oxide during travel of the ribbon along the annealing lehr at a speed of 4.5 m/min. The spray gun was fed with a solution obtained by dissolving cobalt acetylacetonate $Co(C_5H_7O_2)_2 2H_2O$ in dimethylformamide in an amount of 140 g of the acetylacetonate per liter of the solvent. The gun was directed at an angle of 30° to the plane of the glass ribbon and was located 25 cm above the ribbon and at a position in the lehr such that the droplets of the sprayed solution impinged on the glass ribbon where the glass had a mean temperature of the order of 580° C. The spray gun was reciprocated at ten complete reciprocations per minute. The rate of discharge of the coating solution was adjusted to form on the glass a coating of cobalt oxide ($Co_3O_4$) having a thickness as near as possible to 920 A.

The ducting 22 comprised ten side by side ducts having their discharge orifices 24 located below the path of the spray gun and 10 cm above the glass ribbon. Hot air pre-heated to 350° C. was supplied through this ducting 22 at a volume rate of 1500 m³/hr to form the side by side currents of air 25 with a velocity of 2 m/sec. The temperatures of the air currents were independently regulatable in steps of 20° C. and regulation was effected in dependence on signals from a coating thickness detector as in Example 1 in order to keep the coating thickness an uniform as possible over the width of the ribbon. It was found that a coating could be formed which had a thickness of 920 A ±50 A over the full width of the glass ribbon. In a comparative test in which the spray was not heated by gas currents but which otherwise employed the same conditions, it was found to be impossible to obtain a coating having such a high standard of uniformity.

By heating the air supplied to ducting 22 to lower temperatures, e.g. to temperatures of the order of 150° C. regulatable in steps of 10° C., the rate of evaporation of the dimethylformamide from the droplets and the rate of decomposition of the acetylacetonate can be decreased, thereby leading to thinner coatings.

The foregoing coating procedures can be followed for forming coloured layers composed of a mixture of oxides by feeding the spray gun with a solution containing a mixture of compounds of different metals, e.g. compounds of metals selected from the group iron, cobalt, chromium and nickel, or by making use of a plurality of spray guns and feeding different solutions simultaneously through different guns.

We claim:

1. In a process of forming a metal or metal compound coating on a face of a heated glass substrate during its displacement in a given direction, constituting a forward direction of displacement, by contacting such face, at a coating station through which the substrate passes, with at least one stream of droplets composed of at least one substance from which said coating metal or metal compound is formed on said face, the improvement comprising causing said stream of droplets to travel downwardly at an inclination to a direction parallel to the forward direction, discharging at least one current of pre-heated gas into the environment above the substrate so that such gas flows in said direction parallel to the forward direction above the substrate and into contact with said stream, and regulating the temperature of such gas current such that said current influences the temperature of droplets of said stream on their way to the substrate.

2. A process according to claim 1, characterised in that the gas constituting said current is pre-heated to an extent such that it heats said droplets.

3. A process according to claim 1 or 2, characterised in that said gas current is caused to influence the temperature of the droplets selectively or differentially at at least one region across the path of the substrate so as at least partially to compensate for a tendency for the coating to vary in thickness because of other factors.

4. A process according to claim 3, characterised in that the substrate is a continuous ribbon of flat glass travelling from a flat glass forming plant and said gas current differentially affects the temperature of the droplets travelling towards different regions across the ribbon path so as to promote the formation of a coating which is of substantially uniform thickness over the full coated width of the ribbon.

5. A process according to claim 1 or 2, characterised in that the droplets comprise a solution of a metal compound and said gas current accelerates or retards evaporation of solvent from the droplets.

6. A process according to claim 1 or 2, characterised in that at least one said stream of droplets impinges on a zone within the substrate width to be coated and further comprising repeatedly displacing such stream to and fro transversely across the substrate path.

7. A process according to claim 1 or 2, characterised in that said at least one current of pre-heated gas is discharged continuously and the droplet stream is continuously intersected over its full width by said at least one current.

8. A process according to claim 1 or 2, characterised in that said at least one current of pre-heated gas is constituted by a plurality of currents continuously discharged from a series of stationary orifices distributed transversely over the path of the substrate.

9. A process according to claim 8, characterised in that quanta of gas supplied to different orifices are preheated to temperatures which are independently regulated for controlling the coating thickness profile across the substrate.

10. A process according to claim 1 or 2, characterised in that said step of regulating the gas temperature comprises pre-heating the gas forming said gas current in an automatically controlled manner in dependence on signals emitted by a device which detects thickness values of the coating on the moving substrate at a detecting station located in the forward direction from the coating station.

11. A process according to claim 1 or 2, characterised in that the gas current is directed towards the droplet stream so as to encounter that stream at a zone spaced above the substrate.

12. A process according to claim 1 or 2, characterised in that said coating station is located within a lehr through which the substrate travels.

13. A process according to claim 1 or 2, characterised in that said droplet stream travels downwardly and in the forward direction towards the substrate.

14. A process according to claim 1 or 2, characterised in that the included angle between the axis of the droplet stream and the substrate face being coated is in the range of 20° to 60°.

15. A process according to claim 14, characterised in that said included angle is in the range of 25° to 35°.

16. A process according to claim 1 or 2, characterised in that there is at least one said stream of droplets which is a parallel stream or which diverges from its source at an angle of not more than 30°.

17. A process according to claim 1 or 2, characterised in that there is at least one said droplet stream whose source is at a perpendicular distance of from 15 to 35 cm above the substrate face being coated.

18. A process according to claim 1 or 2, characterised in that the droplets are droplets of a solution of a metal salt.

19. A process according to claim 18, characterised in that the droplets are droplets of a solution of a metal chloride from which a metal oxide coating forms on the substrate.

20. A process according to claim 19, characterised in that said solution is a tin chloride solution.

21. A process according to claim 1 or 2, further comprising creating suction forces in exhaust ducting to draw gases environmental to the droplet stream away from said stream in the same direction parallel to the forward direction over the substrate as that in which said gas current is discharged.

22. A process according to claim 1 or 2, characterised in that said at least one current of pre-heated gas is continuously discharged from a stationary orifice.

23. A process according to claim 1, characterised in that the substrate is a continuous ribbon of flat glass travelling from a flat glass forming plant.

24. A process according to claim 23, characterised in that the substrate is a ribbon of float glass travelling from a float tank.

25. A process according to claim 23 or 24, characterised in that at least one said droplet stream impinges on the top face of the ribbon at a position where the temperature of the glass is within the range of 650° to 100° C.

* * * * *